United States Patent [19]
Rosman

[11] Patent Number: 4,702,076
[45] Date of Patent: Oct. 27, 1987

[54] HYDRAULICALLY OPERATED CLAM-SHELL DEVICE

[75] Inventor: Alan H. Rosman, Madrid, Spain

[73] Assignee: Dynamic Hydraulic Systems, Inc., Canoga Park, Calif.

[21] Appl. No.: 633,397

[22] Filed: Jul. 23, 1984

Related U.S. Application Data

[63] Continuation-in-part of Ser. No. 601,481, Apr. 18, 1984, which is a continuation-in-part of Ser. No. 570,590, Jan. 13, 1984.

[51] Int. Cl.[4] ............ F16H 39/46

[52] U.S. Cl. ............ 60/372; 60/378; 60/414; 91/189 R; 91/517; 212/250; 294/68.23; 414/726

[58] Field of Search ............ 60/413, 414, 415, 416, 60/417, 418, 487, 488, 490, 911, 372, 378; 37/116, DIG. 1, DIG. 7, DIG. 9, DIG. 11, 183 R, 184, 136; 414/730, 726; 91/512, 517, 189 R; 212/259, 251, 250; 294/68.23, 111; 417/217

[56] References Cited

U.S. PATENT DOCUMENTS 3,238,722 3/1966 Berkman et al. ............ 60/414
3,479,077 11/1969 Martin et al. ............ 294/68.23
3,971,215 7/1976 Baron et al. ............ 60/416
4,098,377 7/1978 Callaghan ............ 91/517
4,111,783 9/1978 Hastings, Jr. ............ 91/433
4,161,135 7/1979 Garlinghouse ............ 91/461 X
4,231,698 11/1980 Lado ............ 60/484
4,546,607 10/1985 Kime ............ 60/372

FOREIGN PATENT DOCUMENTS 0606946 5/1978 U.S.S.R. ............ 37/116
806585 2/1981 U.S.S.R. ............ 294/68.23

*Primary Examiner*—Edward K. Look
*Attorney, Agent, or Firm*—Hopgood, Calimafde, Kalil, Blaustein & Judlowe

[57] ABSTRACT

The invention contemplates a hydraulically operated twin-cable suspension for a clamshell or the like load-handling device. In a preferred embodiment, a charged accumulator is effectively a counterweight and is the source of all hydraulic fluid needed for the full range of actuation of two traction cylinders, one for each of the respective cables. Both cables automatically share the load, without slack, in any elevational situation, and simple hydraulic control circuitry selectively enables (a) an automated closing dig into loadable material and (b) a quick opening for load discharge. A single power integrator is interposed between the accumulator and the two traction cylinders for directionally controlling hydraulic-fluid displacement between the accumulator and the traction cylinders, as needed for all cable displacements.

17 Claims, 3 Drawing Figures

HYDRAULICALLY OPERATED CLAM-SHELL DEVICE

RELATED CASES

This application is a continuation-in-part of application Ser. No. 601,481, filed Apr. 18, 1984, which in turn is a continuation-in-part of original application Ser. No. 570,590, filed Jan. 13, 1984.

BACKGROUND OF THE INVENTION

The invention relates to hydraulic lift mechanism and in particular to such mechanism as is required to serve intermittent alternating vertical displacement of a load, wherein the load may be of various magnitudes within the capacity of the mechanism. Such conditions exist for hydraulically operated cranes and hoists, and the present invention is particularly concerned with clamshell devices as the means of picking up and discharging a loading of a crane or hoist.

Clamshell load-handling devices are of various configurations but are of a nature to require two cable suspensions—(a) for carrying the load, i.e., the clamshell device plus such load as it may contain and (b) for determining shell-opening and/or closing action of the device. The two cables are run from separate winches, with associated brakes and clutches, and relatively great operator skill is required in the selective sequential, concurrent and directional control of the winches and their cables, in order to perform the lift, drop and dig functions expected of the clamshell device.

Conventional cranes and hoists employ a prime mover such as a diesel engine or one of various types of electric motor, depending upon the design capacity of the involved lift system, and the rated power of the prime mover is conservatively selected for assured handling of the maximum rated load of the system. In most cases, the system further requires a gearbox, a speed reducer, a pulling drum (or winch) and a safety brake. Illustratively, for example, a crane with a 1-ton lift capacity (at one meter/second) requires a prime mover of 15 horsepower, and a crane with 10-ton lift capacity (at the same one meter/second) requires a prime mover of 150 horsepower. These requirements are not reduced when a clamshell device must be an operational component of the crane or hoist system.

BRIEF STATEMENT OF THE INVENTION

It is an object of the invention to provide improved mechanism for operation of a clamshell device of the character indicated.

It is a specific object to provide hydraulic means to achieve the above object.

It is a further specific object to achieve the above objects with great economy of prime-mover power, for a given system-load capacity.

It is also a specific object to achieve the above objects with greatly simplified and precise control of lift, load and drop functions.

A general object is to meet the above objects with simplified structure, at reduced overall expense, and inherently characterized by materially reduced operating cost.

The invention in a preferred embodiment achieves the foregoing objects with hydraulic-lift or crane mechanism which employs what I term a power integrator in the connection between a charged hydraulic accumulator and a pair of hydraulic actuators for the respective suspension cables associated with the clamshell device via which the crane handles its load. The power integrator, additionally, has a prime-mover connection, and the pressurized charge of the accumulator is advisedly set to fully accommodate a preselected level of average load upon the two actuators.

More specifically as to the clamshell suspension, a first one of the hydraulically actuated cables provides the "clamshell" (or primary lift) connection, and the other hydraulically actuated cable provides the "hook" (or secondary lift) connection. Pressure-responsive control componentry temporarily cuts off hydraulic supply to the "hook" connection actuator to enable the clamshell device to dig into loadable material (such as a pile of grain, sand, gravel or coal) until the clamshell has closed in its grasp of a load, whereupon the cutoff is removed and both actuators share in lifting the loaded clamshell. A simple push-button operation releases the load and automatically opens the clamshell, in readiness to dig into the next increment of load. Importantly, the same single control of the power integrator can provide full elevational positioning control of the clamshell, whether or not loaded, along with automatic operation of the clamshell device itself, subject to the exception of push-button operation to determine when the clamshell is to be opened, e.g., a clamshell load is to be dropped, and when the clamshell is to be closed.

Further specifically, the hydraulic circuit which supplies the two cable actuators and their pressure-responsive control componentry includes check valves, with a pilot-operated check valve interposed between the power integrator and the accumulator and another pilot-operated check valve interposed between the power integrator and the two cable actuators. The pilot-operated check valves cooperate with other check valves to assure automatic transfer of hydraulic fluid under pressure from the accumulator to the load actuator, and vice versa, as may be determined by selected control of or via the power integrator. The system of check valves also cooperates with pump action associated with rotation of the power integrator, to assure that adequate fluid is drawn from a sump and is deliverable for pilot-operated functions; stated in other words, with minimum reliance upon the sump, the system provides maximum conservation of energy in effecting such transfer of pressurized hydraulic fluid, from and to the accumulator, as may be involved in any controlled lift or descent of any load, within the capacity of the system.

A power integrator, as contemplated herein, is a rotary liquid-displacement device having two spaced flow-connection ports and an interposed rotor with externally accessible shaft connection to the rotor, and the expression "rotary" as used herein in connection with such a device is to be understood as including various known rotary-pump structures, such as gear-pump and sliding-vane devices, as well as axially reciprocating and radially reciprocating configurations, wherein rotor-shaft rotation is related to hydraulic flow into one port and out the other port. In other words, for purposes of the invention, such "rotary" devices provide for such hydraulic flow, and they provide for an external input/output torque-response relation to the hydraulic flow.

DETAILED DESCRIPTION

The invention will be illustratively described in connection with the accompanying drawings, in which.

Figure 1:
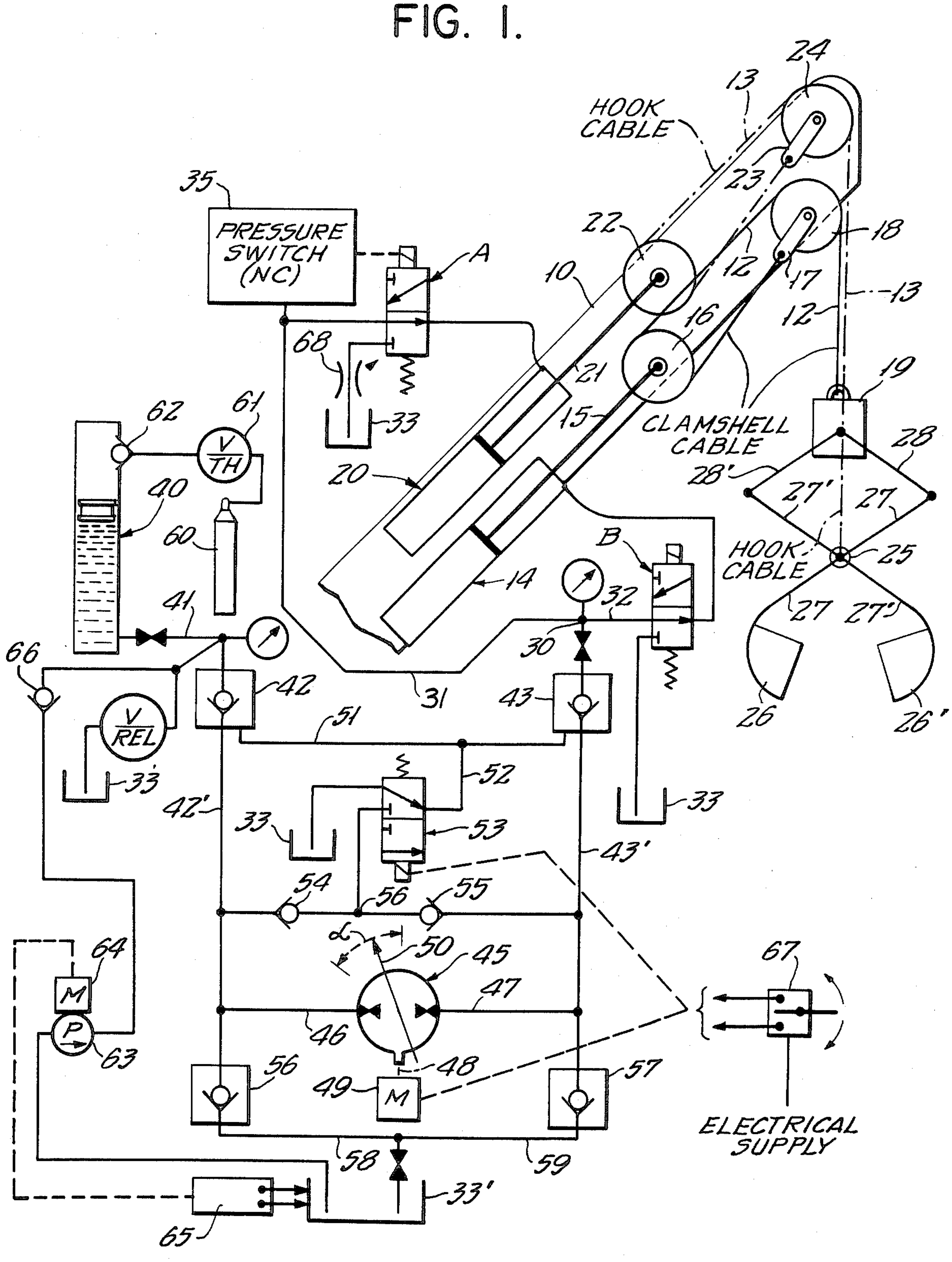
FIG. 1 is a hydraulic-circuit diagram schematically illustrating a crane or the like hoist wherein a clamshell device is suspended and actuated via hydraulically actuated cables.

Referring to FIG. 1, the invention is first illustratively shown in application to a crane or hoist system having a boom 10 from the upper end of which a clamshell device 11 is suspended, via a so-called "clamshell" or primary cable 12 and via a so-called "hook" or secondary cable 13. A first traction cylinder 14 is mounted to a lower region of boom 10, with the rod 15 of its piston extending upward and carrying a pulley 16 at its upper end. Rod (15) displacement is doubled by tethering one end of the primary cable 12 to a bail or other fastening 17 and by coursing cable 12 over rod pulley 16 and a boom-mounted suspension pulley 18, the suspended end of cable 12 being terminated at a block 19 at the upper end of the clamshell device 11. A second traction cylinder 20 is also mounted to a lower region of boom 10, with the rod 21 of its piston extending upward and carrying a pulley 22 at its upper end. Rod (21) displacement is doubled by tethering one end of the secondary cable 13 to a bail or other fastening 23 and by coursing cable 13 over rod pulley 22 and a boom-mounted suspension pulley 24, the suspended end of cable 13 being terminated at a "hook" connection 25 of the clamshell device 11.

The clamshell device 11 is schematically shown to comprise half-shell formations 26–26′ at the lower ends of primary arms 27–27′ which are pivotally related at the "hook" connection region 25. Two further arms 28–28′ are pivotally related at their connection to block 19, and arms 28–28′ are pinned to the upper ends of the primary arms 27–27′ so as to define (with arms 27–27′) a four-bar linkage or pantograph above the hook-connection point 25. The block 19 will be understood to symbolize sufficient mass associated with the cable-12 connected upper end of the pantograph, so that upon release of traction pressure in cylinder 14 (without release of traction pressure in cylinder 20), the pantograph will gravitationally compress, to spread half shells 26–26′ apart.

Figure 2:
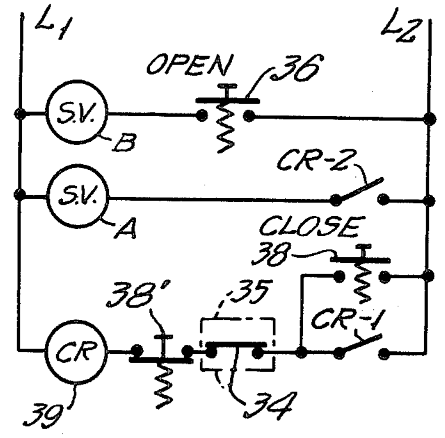
FIG. 2 is a simplified electrical ladder diagram for electrical connection of components in FIG. 1.

Pressurized lift/descent actuating hydraulic flows are distributed to both traction cylinders 14-20 via a common connection point 30, serving the tail end of cylinder 20 via a line 31 which includes a first two-position solenoid valve A, and serving the tail end of cylinder 14 via a line 32 which includes a second two-position solenoid valve B. Solenoid valve A is actuated to bleed pressure fluid in "hook" cylinder 20 to sump 33 only during actuation of clamshell 11 from its open position (shown) to its closed position, and solenoid valve B is actuated to bleed pressure in "clamshell" cylinder 14 to sump only when it is desired to actuate clamshell 11 from its closed to its open position. The shell-closing function attributable to solenoid valve A is governed by normally closed contacts 34 (see FIG. 2) of a pressure-sensitive switch 35 connected to sense pressure in line 31, in a manner to be later explained; and the shell-opening function attributable to solenoid valve B is governed by the normally open contacts of a stop button 36 (see FIG. 2) also to be later more fully explained. And it will be understood that the same designation 33 for all sumps indicates that they all have a common point of sump-return accumulation, as to the lowermost sump 33′ in the system shown.

In the hydraulic arrangement shown, a charged hydraulic accumulator 40 is employed as a "counterweight", continuously operative upon fluid via point 30 to lines 31 and 32 to effectively balance the dead load of clamshell device 11, plus a predetermined live-load magnitude which is selected to be intermediate zero live load and full-rated live load, and generally one half the full-rated live load. More specifically, a line 41 for hydraulic flow to or from accumulator 40 is connected to the distribution point 30 for hydraulic flow from or to cylinders 14–20 via pilot-operated check valves 42–43 oriented to check hydraulic flow from accumulator 40 on the one hand and from cylinders 14–20 on the other hand, in the absence of a pilot-operated opening of one or the other of these valves 42–43; and a power integrator 45 is interposed between lines 42′–43′ served by the respective check valves 42–43. The power integrator 45 is a rotary-displacement device having first and second flow-connection ports 46–47 to which lines 42′–43′ are respectively connected, and an interposed rotor has externally accessible shaft connection 48 to a prime mover such as a reversible electric motor 49; detailed descriptions of suitable power integrators are provided in said applications Ser. No. 570,590 and Ser. No. 601,481, and therefore need not be repeated now. As shown in FIG. 1 (see arrow 50), the power integrator 45 is desirably a variable flow device, wherein variation in flow may be a function of a manual control, for example, a directly applied torque or using a fluid-pressure assist in applying the control torque.

It is preferred that pilot opening of the respective check valves 42–43 shall be in response to a single actuating pressure. Thus, a line 51 establishes parallel connection of the respective pilots of check valves 42–43, and the circumstance of sufficient hydraulic pressure in a control line 52 is operative to dislodge both check valves 42–43 from their normally closed condition. This line-52 control connection additionally includes a solenoid-operated valve 53 which is normally positioned to discharge pressure fluid in line 52 to sump but which is solenoid-actuable to enable pressure fluid in either of the integrator-port lines 46–47 (42′–43′) to pass via line 52 for concurrent pilot-driven opening of both check valves 42–43, there being isolation check valves 54–55 (connected back to back at 56 to valve 53) to assure integrity of the described pilot-operating connection 52.

Two further check valves 56–57 in separate lines 58–59 of connection from sump 33′ to the respective port connections 46–47 of the power integrator, are operative to assure an initial supply of hydraulic fluid to the power integrator, no matter what the initial direction of drive from motor 49; specifically, each of the check valves 56–57 is oriented to check or block any flow in the direction of sump 33′.

A brief operating description may now be given for the circuit of FIG. 1, which is to be understood as an illustration of a first mode of use, namely, involving a variable-flow power integrator (45) in combination with a reversible (bidirectionally operable) electric motor (49) as the prime mover.

Initially, one may assume a filled system wherein the pistons of cylinders 14–20 are locked at a particular level of suspension of clamshell device 11, by reason of load-induced pressure in lines 31–32 forcing closure of check valve 43; and it will be understood that a charge of pressurized gas (e.g., nitrogen) will have been supplied (as via a commercial container 60 and suitable throttle and check valves 61–62) to the upper end of accumulator 14 over an adequate volume of hydraulic fluid, the gas pressure being retained by check valve 62 and the hydraulic outlet 41 of the accumulator being blocked and held, by forced closure of check valve 42. Hydraulic fluid lost to sumps and returned to the base sump or reservoir 33' will have been restored to accumulator 40 by the operation of a pump 63 driven by a motor 64 in response to bilevel sensing of hydraulic fluid in sump 33', a bi-level sensitive switch 65 being shown for the purpose, controlling excitation of motor 64 for a sensed upper level at 33', and controlling disconnection of motor 64 for a sensed lower level at 33'. A check valve 66 in the delivery line to the accumulator assures flow only in the direction to restore hydraulic fluid to the accumulator.

As noted above, pressure in the accumulator 40 will have been selected to enable counter-weighting of an average load of clamshell 11, and the liquid volumetric capacity of the accumulator is such as to enable at least full displacement of the traction cylinders, without material change of accumulator pressure. Full accumulator pressure is thus applied against check valve 42 at all times, and the load-reflecting ram (traction-cylinder) pressure against check valve 43 may or may not be the same; ram pressure against check valve 43 will be slightly greater than accumulator pressure if the weight of the loaded clamshell 11 happens to be greater than the preselected "average", and ram pressure against check valve 43 will be slightly less than accumulator pressure if loaded-clamshell weight happens to be less than "average". By contrast, pressure on the other sides (42'–43') of check valves 42–43 will have been relieved, first, by the normal (i.e., unactuated) state of valve 53 wherein pilot-operating pressure in line 51 is vented to sump; secondly, unavoidable minor leakage at the shaft seal of integrator 45 (e.g., to sump via a drain connection, not shown) will have relieved pilot-actuating pressures in lines 42'–43'.

As also noted above, the variable-flow power integrator 45 may be controlled as to volumetric rate, by manual (e.g., servo-assisted) means 50, which may be a control lever having a span $\alpha$ of angular positioning, corresponding to zero to maximum speed of lift or drop of the clamshell 11, while the direction of traction-cylinder displacement is a function of selecting the direction of excitation of reversible motor 49. The latter selection of direction may be via a finger-operated motor-start switch 67 piggy-backed to the speed-control lever 50, although for simplicity in FIG. 1, switch 67 is separately shown; and a dashed-line connection from the motor-start switch 67 will be understood to indicate that valve 53 is actuated upon a starting of motor 49.

Let it be assumed that clamshell 11 has been dropped, jaws open, onto a pile of material to be picked up and deposited elsewhere within range of the crane, of which boom 10 is a part; both check valves 42–43 will be closed, and hydraulic pressure at 30 will be lower than the pressure setting of switch 35, so that the normally closed contacts 34 of switch 35 will have operated solenoid valve A to its position of venting cylinder 20 to sump. As more specifically seen in FIG. 2, clamshell-closure action is enabled by pressing a button 38 to excite a control-relay (CR) winding 39, via the normally closed contacts of pressure switch 35; hold-in contacts CR-1 maintain relay excitation, and further relay contacts CR-2 actuate solenoid valve A to its position of stopping flow in line 31. It the operator should change his mind and decide to avoid the enablement, another stop button 38' in series with relay winding 39 permits him to cancel the hold-in function.

Lift operation is initiated by actuating switch 67 to start motor 49 in the lift direction with lever 50 set for the desired lift speed; motor (49) rotation causes integrator 45 to function as a low-volume pump of hydraulic fluid into port 46 and out of port 47. The suction involved in such pump action immediately and for a brief instant draws an increment of hydraulic fluid from sump (reservoir) 33' via line 58 and its associated check valve 56. This action is brief and the drawn increment is small because lines 42'–43' were already full, so that the drawn increment quickly builds pilot-operating pressure via line 42'; at the same time, control switch 67 will have provided a solenoid-operating signal to valve 53, whereby pilot-operating pressure in line 42' is delivered via lines 52–51 to both check valves 42–43, thus opening both check valves 42–43. Once only partially opened, check valve 42 admits full accumulator pressure to line 42', thereby closing check valve 56 and presenting accumulator pressure to port 46 of the integrator; when check valve 43 begins to open, ram (load) pressure is established in line 43', thereby assuring continued closure of check valve 57 and presenting ram pressure to port 47 of the integrator.

Once motor 49 and valve 53 are actuated, both check valves 42–43 are held open, allowing port 46 to assume instantaneous accumulator pressure and port 43' to assume instantaneous ram pressure. Motor 49 continues to run, because hydraulic-fluid must be displaced from the accumulator to the cylinders 14–20 in the desired process of closing the clamshell and lifting the load completed by such closure. As long as the instantaneous load is less than the predetermined "average", accumulator pressure alone is sufficient for upward displacement of the clamshell; in this event, the fluid-displacement response of the rotor of integrator 45 will develop a torque by which motor 49 becomes a generator, feeding a quantum of electrical energy back into the supply grid. If on the other hand, the live load is greater than average, motor 49 will remain a prime mover for pump action in the integrator, raising inlet accumulator pressure at port 46 to a greater level at port 57 while also displacing a driving flow of hydraulic fluid from the accumulator to the cylinder-distribution point 30.

More specifically, in terms of action on the clamshell 11, the initial displacement of hydraulic fluid past distribution point 30 will be solely via line 32 to cylinder 14, in view of the fact that the actuated condition of solenoid valve A has temporarily cut off any such supply via line 31. As a result, traction displacement via cylinder 14 alone is operative to lift only the top end 19 of the clamshell, causing the half shells 26–26' thereof to close and thus to complete a loading of the clamshell. At the same time, the venting to sump of fluid in traction cylinder 20 allows the hook cable 13 to drop and permit the half shells 26–26' to dig down into its load material. When the two half shells 26–26' have come together, pressure in both of lines 31–32 rises past the threshold setting of switch 35, whereupon its normally closed contacts open and solenoid valve A is de-energized, allowing the same to pass pressure fluid from line 31 to cylinder 20. Continuing fluid displacement from the accumulator 40 to both cylinders 14–20 causes both cylinders (and their cables 12–13) to share the lifting load until a desired elevation is reached for the loaded clamshell, termination of lift being achieved by merely terminating the start-switch setting at 67. During the lifting process, it will be understood that boom 10 may have been displaced, by means not shown, to bring the lifted load to a desired point of load discharge. Release of the load, i.e., by opening the clamshell, is merely by depressing a push button 36 to enable excitation of solenoid valve B, whereby cylinder 14 is vented to sump and cable 12 is relaxed, to allow block 19 to displace downwardly with respect to the point 25 of hook-cable connection.

Having opened the clamshell to discharge its contents, the crane boom is maneuvered back to the pick-up location, and switch 67 is actuated to excite motor 49 in the direction to determine return of hydraulic fluid to the accumulator as the open clamshell is lowered into the pick-up location, whereupon the switch 67 is turned off, or is reversed so that the cycle of operations can then be repeated.

It will be seen that certain advantages flow from providing a restrictive orifice in the venting circuit of each of the respective valves A and B. In the case of valve A, the orifice 68 is adjusted to assure a desired relatively slow closure of the clamshell jaws 26–26', for optimum dig action into the material being loaded. In the case of valve B, no orifice is needed for venting fluid from cylinder 14 to sump.

Figure 3:
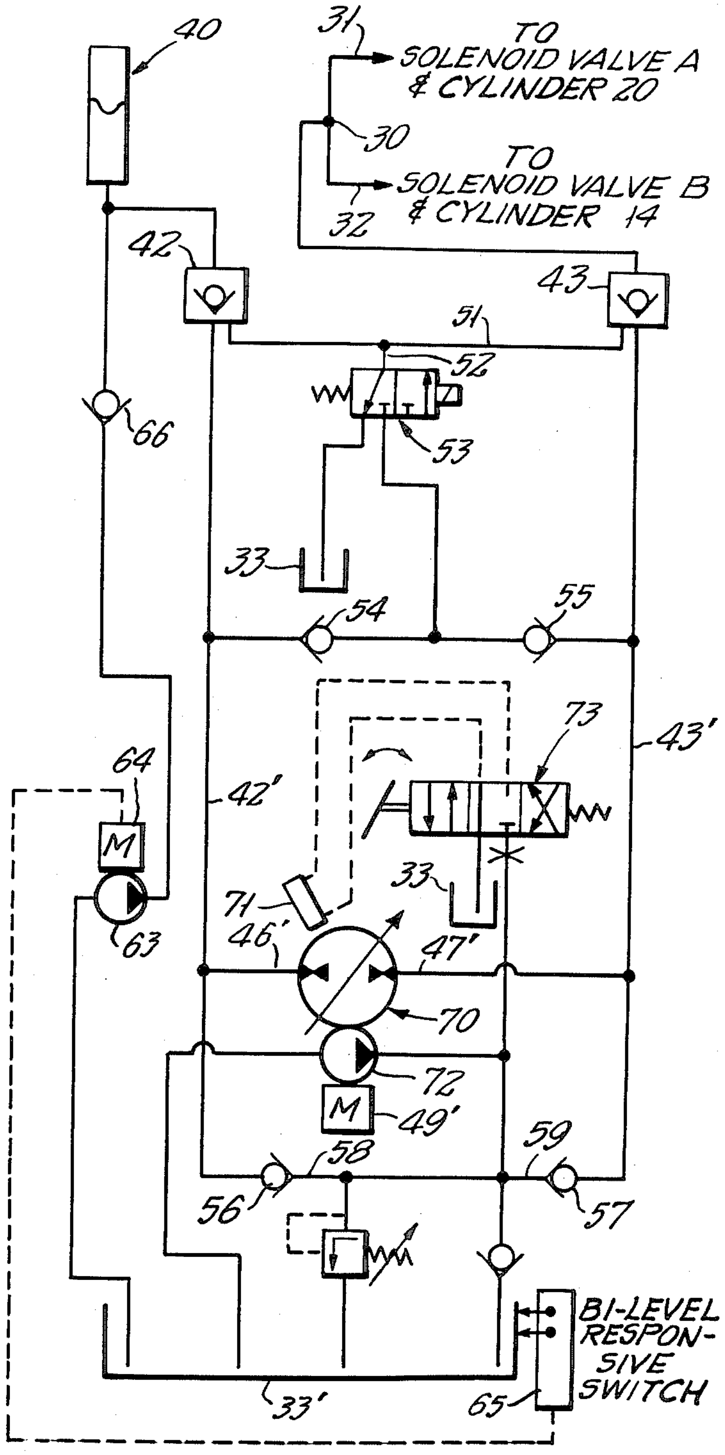
FIG. 3 is a fragmentary diagram similar to FIG. 1, to show an alternative arrangement.

The crane-hoist circuit of FIG. 3 will be recognized from said earlier-filed patent applications. The circuit is intended for heavier-duty use than that of FIG. 1, but many of the component functions remain the same and therefore the same reference numerals identify corresponding parts; also, the same reference numerals with further-primed notation in certain cases identify analogous components. The output connection 30 to lines 31–32 to the respective traction cylinders is totally compatible with the clamshell operating system of FIG. 1 and therefore such detail is not repeated in FIG. 3. The principal difference involved in the heavier-duty system of FIG. 3 is that the prime mover 49' is unidirectional, being illustratively a diesel engine or a unidirectional electric motor.

The integrator 70 of FIG. 3 is analogous to what has been discussed for use in FIG. 1, but in view of the heavier-duty and unidirectional conditions applicable to the FIG. 3 system, it is preferred to rely upon a rotary hydraulic-displacement device which is piston-acting in nature, as for example a variable-displacement axial-piston pump wherein a rotated swash plate is adjustably inclined with respect to the axis of rotation to determine not only the adjusted magnitude of the volumetric rate but also the flow direction between ports 46'–47' for which the volumetric rate has been selected; alternatively, the integrator 70 may be a variable-displacement radial-piston pump wherein the volumetric rate is similarly adjustable for essentially constant-speed rotation of a rotor element Adjustment of the volumetric rate is schematically shown to be governed by a double-acting cylinder 71 and, for this purpose an auxiliary pump 72 of relatively low capacity (i.e., relatively low volume and low pressure delivery) is provided, the pump 72 drawing on reservoir 33' for its supply of hydraulic fluid and utilizing a manually operable three-position selector valve 73 for operation of the double-acting cylinder 71.

For the neutral position of valve 73, there is no actuation via cylinder 71, but the selected end position of valve 73 will determine whether pressure fluid initially supplied by pump 72 will shift the integrator 70 to full volumetric rate in the flow direction from port 46' to port 47' (causing lifting displacement of clamshell 11), by reason of fluid transfer from accumulator 40 to the traction cylinders 14–20, or whether integrator 70 will be shifted to full volumetric rate in the opposite flow direction, from port 47' to port 46' (causing descent of the clamshell) and return of system fluid to accumulator 40.

In FIG. 3, both pilots (42–43) are again served by the same single source of operating pressure, available in lines 51–52 upon actuation of solenoid 53, which actuation will be understood to be interlocked (by means not shown) with operation of the prime mover 49'.

The described invention will be seen to achieve all stated objects and to be applicable to a variety of prime-mover systems as well as to a variety of crane, hoisting and other lifting systems. The chosen application to a clamshell device will also be understood to be illustrative of a variety of devices in which two separate winch-drive systems were previously believed necessary to accomplish manipulation of articulated load-connecting elements which also have to be raised and lowered. With the invention, a single control enables simple management of all functions, and the cables of both traction cylinders automatically share in suspension of the total load. Hydraulic fluid is conserved and automatically returned to the accumulator so that all functions are achievable for unlimited cycles of clamshell loading and dumping, merely by making sure that the entire system can operate between the on-off limits of the bi-level switch 65.

While the invention has been shown and described for preferred embodiments, it will be understood that modification may be made without departing from the scope of the invention. For example, the traction cylinders may be designed for other than the 2:1 cable-displacement relation which applies for the described embodiments, the ratio being as may be desired, compatible with traction cylinder dimensions and accumulator working pressure, typically 3000 psi, in which case the threshold for operation of switch 35 may illustratively be 3300 psi. Also, by way of example, in place of traction cylinders 14–20 (which inherently conserve hydraulic fluid within a given system), rotary hydraulic motors may be used, as described in detail in said earlier-filed patent applications, i.e., in conjunction with a suitable system of recycling hydraulic fluid, all as described in said applications.

Still further, while it is preferred to use a power integrator device in an accumulator-counterweighted system as herein described, it will be understood that the clamshell lifting and actuating part of the system requires only a source of suitably controlled hydraulic fluid under pressure; thus, an existing hydraulic-lift system which does not rely on an accumulator may directly use the clamshell operating components described herein.

It is also within the invention to totally eliminate the solenoid valve B as a mechanism for actuating the clamshell for release of its load. It will be recalled that orifice 68 is relatively small, so that actuation of solenoid valve A entails only relatively small leakage of cylinder-20 fluid to sump, while totally blocking hydraulic flow in line 31, to or from valve A. Thus, if solenoid valve A is actuated, for an elevated and loaded clamshell, and if the control of the power integrator (45; 70) is moved for a downward drive of the piston of cylinder 14 (i.e., downward drive of the clamshell cable 12, at a rate much faster than orifice 68 permits for the hook cable 13), then the kinematics of the system necessarily induces chamshell opening. For the circuit of FIG. 2 (in the assumed instance of no solenoid valve B), a mere depression of switch 38, coupled with a down-drive setting of the power integrator, determines the load-release function.

What is claimed is:

1. In a cable-suspended hydraulically operated lift system wherein a clamshell or the like device having separate hook-cable and clamshell-cable suspension connections is to be lifted and/or actuated by separate cables respectively coupled to said hook-cable and clamshell-cable connections, the improvement wherein first and second traction cylinders are mounted in parallel for independent traction-actuation of the respective cables, pressurized hydraulic-accumulator means connected as a closed system which includes separate connections to said traction cylinders, said closed system including reversibly controllable rotary power-integrator means between said accumulator means and the respective separate connections to said traction cylinders, valve means in the separate connection to the traction cylinder associated with the hook-cable connection, said valve means having a first position providing an open-flow connection between said accumulator means and said hook-cable traction cylinder and a second position blocking flow therebetween, and means including a pressure-responsive threshold device connected for response to pressure in the connection to said clamshell-cable traction cylinder, said last-mentioned means being so associated with said valve means as to determine a shift from the second to the first positions thereof upon achievement of a predetermined sensed threshold pressure so that flow from said power-integrator means causes both cylinders to share the lifting load.

2. The improvement of claim 1, in which the separate connection to the traction cylinder associated with the clamshell cable includes further valve means having a first position providing an open-flow connection between the accumulator means and the clamshell-cable traction cylinder and a second position blocking flow therebetween while also venting pressure fluid from the clamshell-cable traction cylinder, and means including a pump for returning vented pressure fluid to said accumulator means.

3. The improvement of claim 2, in which said further valve means includes means normally urging the same to said first position, and selectively operable control means for actuating said further valve means to the second position thereof.

4. The improvement of claim 3, in which said further valve means is solenoid-operated, said control means including a push-button operated circuit connection to the solenoid of said valve means.

5. The improvement of claim 2, in which a vent line connected to said further valve means includes a throttling orifice, thereby limiting the rate of clamshell opening.

6. The improvement of claim 1, in which said valve means in said second position additionally vents pressure fluid from said hook-cable traction cylinder, and means including a pump for returning vented pressure fluid to said accumulator means.

7. The improvement of claim 6, in which a vent line connected to said valve means includes a throttling orifice, thereby limiting the rate of clamshell closure.

8. The improvement of claim 1, in which said power-integrator means includes a rotor adapted for connection to a prime mover.

9. The improvement of claim 8, in which the prime mover is a reversible electric motor.

10. The improvement of claim 8, in which the prime mover is a single direction electric motor, and means for reversibly selecting the direction of flow through said integrator means.

11. The improvement of claim 8, in which the prime mover is a diesel engine, and means for reversibly selecting the direction of flow through said integrator means.

12. The improvement of claim 1, in which said valve means includes means normally urging the same to said first position, and selectively operable control means for actuating said valve means to said second position.

13. The improvement of claim 12, in which said valve means is solenoid-operated, said control means including a push button and relay with hold-in contacts for retaining a solenoid operation of said valve means, said pressure-responsive threshold device including means for tripping out a hold-in function of said relay.

14. In a cable-suspended hydraulically operated lift system wherein a clamshell or the like device having separate hook-cable and clamshell-cable suspension connections is to be lifted and/or actuated by separate cables respectively coupled to said hook-cable and clamshell-cable connections, the improvement wherein first and second hydraulic-lift actuators are mounted in parallel for independent actuation of the respective cables, pressurized hydraulic-accumulator means connected as a closed system which includes separate connections to said actuators, said closed system including reversibly controllable rotary power-integrator means between said accumulator means and the respective separate connections to said traction cylinders, valve means in the separate connection to the actuator associated with the hook-cable connection, said valve means having a first position providing an open-flow connection between said accumulator means and said hook-cable actuator and a second position blocking flow therebetween, and means including a pressure-responsive threshold device connected for response to pressure in the connection to said clamshell-cable actuator, said last-mentioned means being so associated with said valve means as to determine a shift from the second to the first positions thereof upon achievement of a predetermined sensed threshold pressure so that flow from said power-integrator means causes both cylinders to share the lifting load.

15. In a cable-suspended hydraulically operated lift system wherein a clamshell or the like device having separate hook-cable and clamshell-cable suspension connections is to be lifted and/or actuated by separate cables respectively coupld to said hook-cable and clamshell-cable connections, the improvement wherein first and second hydraulic-lift actuators are mounted in parallel for independent actuation of the respective cables, pressurized hydraulic-accumulator means connected as a closed system which includes separate connections to said actuators, said closed system including reversibly controllable rotary power-integrator means between said accumulator means and the respective separate connections to said traction cylinders, valve means in the separate connection to the actuator associated with the hook-cable connection, said valve means having a first position providing an open-flow connection between said accumulator means and said hook-cable actuator and a second position blocking flow therebetween while venting pressure fluid in said hook-cable actuator, and means including a pressure-responsive threshold device connected for response to pressure in the connection to said clamshell-cable actuator, said last-mentioned means being so associated with said valve means as to determine a shift from the second to the first positions thereof upon achievement of a predetermined sensed threshold pressure so that flow from said power-integrator means causes both cylinders to share the lifting load, and means including a pump for returning vented pressure fluid to said acumulator means.

16. The improvement of claim 15, and including selectively operable further valve means in the separate connection to the clamshell-cable actuator, said further valve means having a normal position providing an open-flow connection between the accumulator means and said clamshell-cable actuator and a selectively operable position (a) blocking the open-flow connection and (b) venting pressure fluid from said clamshell-cable actuator.

17. The improvement of claim 14 or claim 15, in which a first pilot-operated check valve is interposed between said accumulator means and said integrator means and a second pilot-operated check valve is interposed between said accumulator means and said actuators and with parallel connection to the respective hydraulic-lift actuators, said check valves being oriented to check flow from said accumulator means to said integrator means and to check flow from said actuators to said integrator means, and pilot-actuating means responsive to rotation of said power-integrator means.

* * * * *